(12) United States Patent
Schricker et al.

(10) Patent No.: US 12,287,247 B2
(45) Date of Patent: Apr. 29, 2025

(54) MEASUREMENT SYSTEM FOR INSTALLATION BETWEEN TORQUE AND/OR FORCE-TRANSMITTING MACHINE PARTS

(71) Applicant: Piezocryst Advanced Sensorics GmbH, Graz (AT)

(72) Inventors: Alexander Schricker, Graz (AT); Michael Hirschler, Graz (AT); Franz Dreisiebner, Graz (AT); Erik Gerstl, Graz (AT)

(73) Assignee: Piezocryst Advanced Sensorics GmbH, Graz (AT)

( * ) Notice: Subject to any disclaimer, the term of this patent is extended or adjusted under 35 U.S.C. 154(b) by 830 days.

(21) Appl. No.: 17/438,410

(22) PCT Filed: Feb. 25, 2020

(86) PCT No.: PCT/AT2020/060051
§ 371 (c)(1),
(2) Date: Sep. 10, 2021

(87) PCT Pub. No.: WO2020/181306
PCT Pub. Date: Sep. 17, 2020

(65) Prior Publication Data
US 2022/0146337 A1    May 12, 2022

(30) Foreign Application Priority Data
Mar. 11, 2019   (AT) .............. A 50199/2019

(51) Int. Cl.
*G01L 1/16* (2006.01)
*G01L 5/00* (2006.01)

(52) U.S. Cl.
CPC .............. *G01L 1/16* (2013.01); *G01L 5/0085* (2013.01)

(58) Field of Classification Search
CPC . G01L 1/16; G01L 1/18; G01L 5/0085; G01L 5/0004; G01L 5/243; G01L 5/0076; G01L 5/167
See application file for complete search history.

(56) References Cited

U.S. PATENT DOCUMENTS

| | | |
|---|---|---|
| 3,931,388 A | 1/1976 | Hafner et al. |
| 4,312,241 A | 1/1982 | Budraitis |
| 4,741,231 A | 5/1988 | Patterson |
| 4,802,371 A | 2/1989 | Calderara et al. |
| 5,821,431 A * | 10/1998 | Durand ..................... G01L 5/16 73/862.043 |

(Continued)

FOREIGN PATENT DOCUMENTS

CH         500602 A      12/1970

*Primary Examiner* — Emily P Pham
(74) *Attorney, Agent, or Firm* — Dykema Gossett PLLC

(57) ABSTRACT

Various embodiments of the present disclosure are directed to a measurement system. In one example embodiment, a measurement system is disclosed including a flat measurement element receptacle and at least one piezoelectric measurement element. The flat measurement element receptacle having substantially parallel cover surfaces, and is installed between torque- and/or force-transmitting machine parts. The at least one piezoelectric measurement element arranged in a through-opening of the measurement element receptacle and mechanically fixed, with play, in the through-opening.

16 Claims, 3 Drawing Sheets

(56) References Cited

U.S. PATENT DOCUMENTS

2018/0149530 A1\* 5/2018 Yamamura ............... G01L 1/16
2018/0306655 A1 10/2018 Cavalloni et al.
2019/0242768 A1\* 8/2019 Sonderegger ........... G01L 5/167

\* cited by examiner

MEASUREMENT SYSTEM FOR INSTALLATION BETWEEN TORQUE AND/OR FORCE-TRANSMITTING MACHINE PARTS

CROSS-REFERENCE TO RELATED APPLICATIONS

This application is a national stage filing based upon International application No. PCT/AT2020/060051, filed 25 Feb. 2020, which claims the benefit of priority to Austria application No. A 50199/2019, filed 11 Mar. 2019.

BACKGROUND

The invention relates to a measurement system having a flat measurement element receptacle having substantially parallel cover surfaces, suitable for installation between torque- and/or force-transmitting machine parts, having at least one piezoelectric measurement element, wherein the measurement element is arranged in a through-opening of the measurement element receptacle. Furthermore, the invention relates to a measurement element with parallel, force-introducing boundary surfaces and a circumferential surface, having piezoelectric measurement element disks arranged between the boundary surfaces.

One measuring task for piezoelectric sensors or a measurement system with several measurement elements is the measurement of moments and transverse forces between two machine parts. The machine parts can each have a flange at the point to be measured, for example. The measurement system should be designed as flat as possible with a low overall height, so that additional mechanical adjustments, e.g. in a shaft assembly, to compensate for the overall height of the measurement system can ideally be omitted. The individual measurement elements of the system must be fixed in their position for the measuring task so that assembly is facilitated and their position relative to each other is known for subsequent evaluation. The measurement elements are clamped mechanically between the two machine parts, for example via the clamping screws of adjacent flanges.

In this context, a flat thin-disk force sensor has become known from EP 0 459 068 B1, the installation height of which corresponds to that of normal standardized washers, so that it can be used for dynamic force measurement of bolt forces, for which a replacement with the washer is necessary. This makes installation possible without mechanical processing of the installation environment. In order not to break the installed piezoelectric washers, measurement elements are used which only measure partial forces of the total bolt force and have a diameter which excludes the risk of breakage. To suppress the effect of the existing gap spring layers, the measurement elements are welded into the sensor holder under high mechanical pretension. The surfaces are then ground over and optionally lapped. The surfaces of the measurement elements must then be coated with a vapor deposition layer to increase their force measurement component. A major disadvantage is that the welded connection of the measurement elements to the measurement element receptacle introduces disturbance variables into the measurement elements. Furthermore, the choice of materials for the measurement element or sensor holder is limited, as only a few materials are suitable for welding to the measurement elements.

Furthermore, a device for measuring the forces and torques acting on machine parts has become known from DE 43 40 670 C2. Piezoelectric pressure measurement elements are arranged in corresponding through-holes in an intermediate plate arranged between two machine parts. The measurement elements are positioned in the correspondingly larger bores of the intermediate plate in a soft, permanently elastic casting compound. To compensate for height differences, plane-parallel adapter disks are additionally provided above and below the measurement elements. A disadvantage is the time-consuming manufacture of the measuring device, wherein the intermediate plate must be ground over on both sides after the casting compound has been applied and the adapter washers have been fitted. In addition, it cannot be ruled out that disturbance variables are introduced into the measurement elements by the casting compound.

It is the object of the present invention to improve a flat measurement system having at least one measurement element of the type described above held in a measurement element receptacle, so that the measurement element is held in a defined position, wherein the introduction of disturbance variables—caused by different thermal expansion as well as unevenness and position tolerances of the adjacent machine parts—is largely avoided.

SUMMARY OF THE INVENTION

According to the invention, this is achieved by mechanically fixing the at least one measurement element with defined play in the through-opening of the measurement element receptacle.

The floating mounting compensates for unevenness and positional tolerances of the adjacent machine parts. The measurement element or the measurement elements of such a measurement system are connected to the measurement element receptacle neither by welded or adhesive joints nor by an elastic casting compound, but are mounted in a floating manner (i.e. fixed in position with sufficient play in all spatial directions) in the through-openings so that no disturbing holding forces can be interspersed in the measurement elements. Minor component differences can be compensated for by the existing clearance between the measurement elements and the measurement element receptacle.

As there is no welding with the measurement elements, different materials can be used for the measurement element receptacle, such as steel, aluminum, different aluminum alloys or even plastics.

Piezoelectric measurement elements are not necessarily made of the same material as the adjacent machine parts. To reduce negative effects due to different thermal expansion, it is advantageous to manufacture the measurement element receptacle from the same material as the adjacent machine parts.

According to the invention, the at least one measurement element has structures on its circumferential surface which engage with play in at least one spatial direction parallel to the cover surfaces and/or normal to the cover surfaces of the measurement element receptacle in corresponding structures on the circumferential wall of the through-opening, wherein different embodiment variants are used.

According to a first embodiment variant of the invention, an annular groove is formed on the circumferential surface of the at least one measurement element, which receives at least one spring element, wherein the spring element engages in an annular groove in the circumferential wall of the through-opening. This greatly simplifies the manufacture of the measurement system. All that is required is to produce a measurement element receptacle adapted to the particular measuring situation, for example a thin, annular measurement element receptacle adapted to a flange in a shaft assembly, by 3D printing or CNC milling, after which the individual measurement elements can be clipped into the through-holes.

In a further advantageous variant of the invention, a circumferential web is formed on the at least one measurement element, which engages in an annular groove in the through-opening, wherein the annular groove is bounded on the one hand by a base part and on the other hand by a cover of the measurement element receptacle which can be inserted into the base part. When assembling the measurement system, the individual measurement elements are inserted into the measurement element receptacle with slight play relative to the through-opening, the cabling is inserted into the base part and mechanically fixed with play after the cover has been fastened.

According to a particularly advantageous embodiment variant of the invention, at least one through-opening in the measurement element receptacle can be designed as an elongated hole. Through a combination of elongated holes and circular through-openings in a measurement element receptacle, a high positioning accuracy can be achieved despite the floating bearing.

A measurement element according to the invention is thus characterized in that the circumferential surface of the measurement element has structures by means of which the measurement element can be mechanically fixed with play in a measurement element receptacle.

BRIEF DESCRIPTION OF THE DRAWING

The invention is explained in more detail below with reference to exemplary embodiments, wherein.

Parts with the same function are provided with the same reference signs in the embodiment variants.

DETAILED DESCRIPTION

Figure 1:
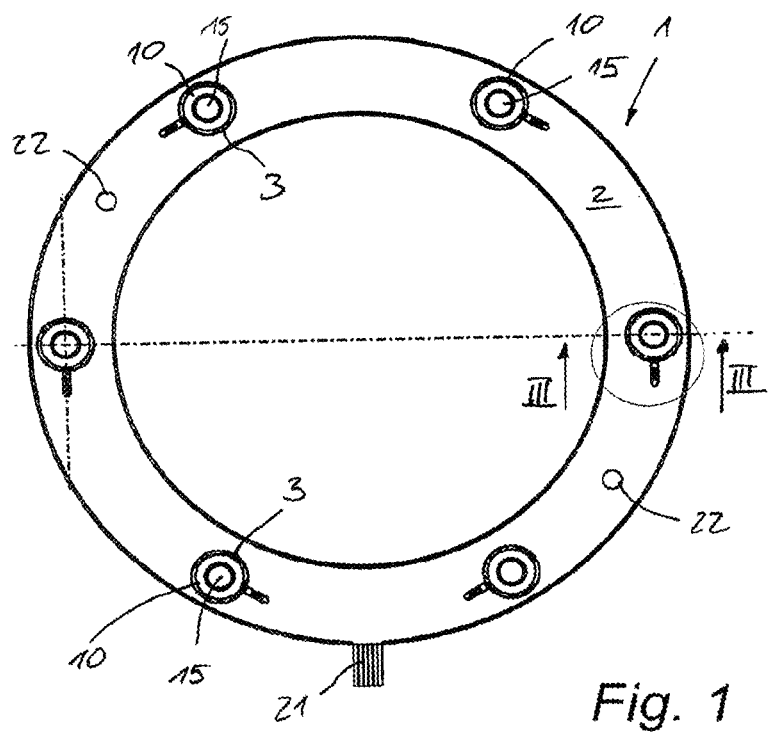
FIG. 1 shows a top view of a measurement system according to the invention having several measurement elements arranged in an annular measurement element receptacle.
Figure 2:
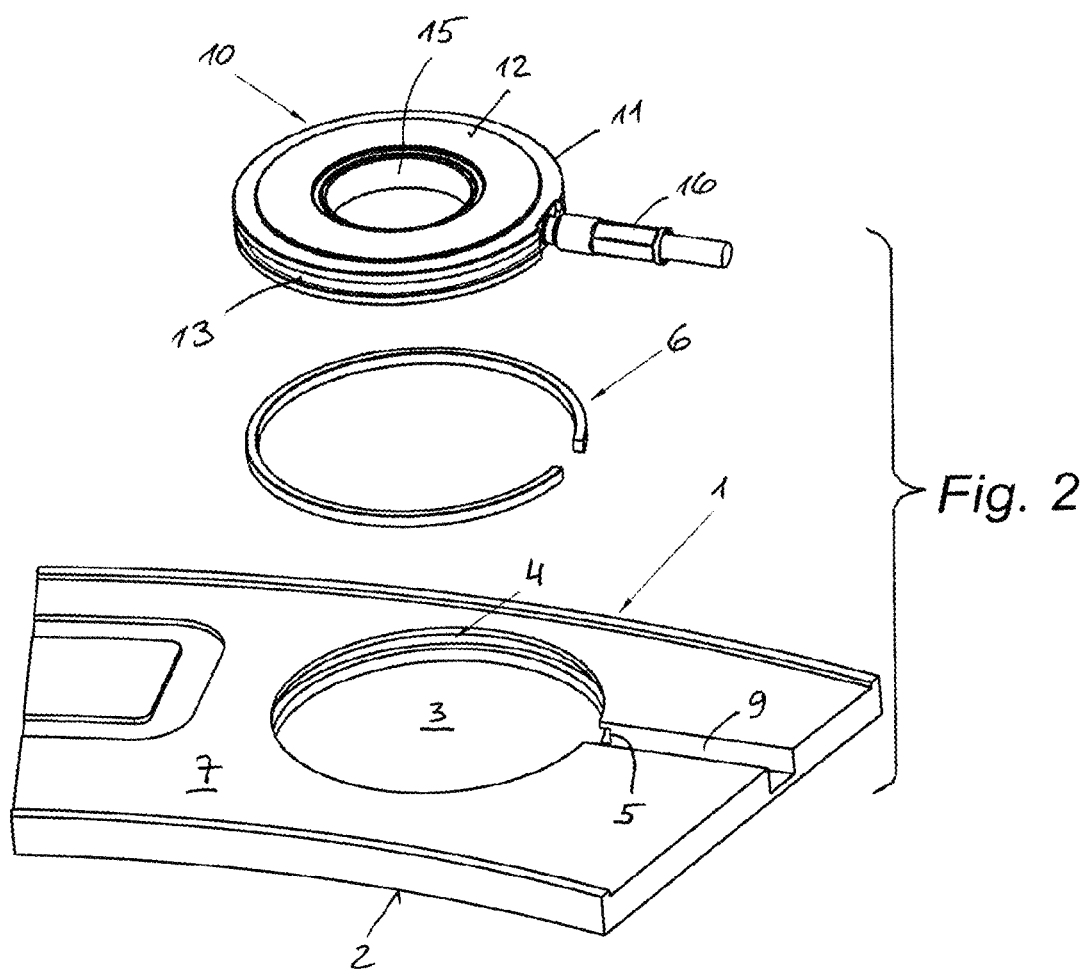
FIG. 2 shows an enlarged detail of the measurement system in the area of a measurement element in an exploded view.
Figure 3:
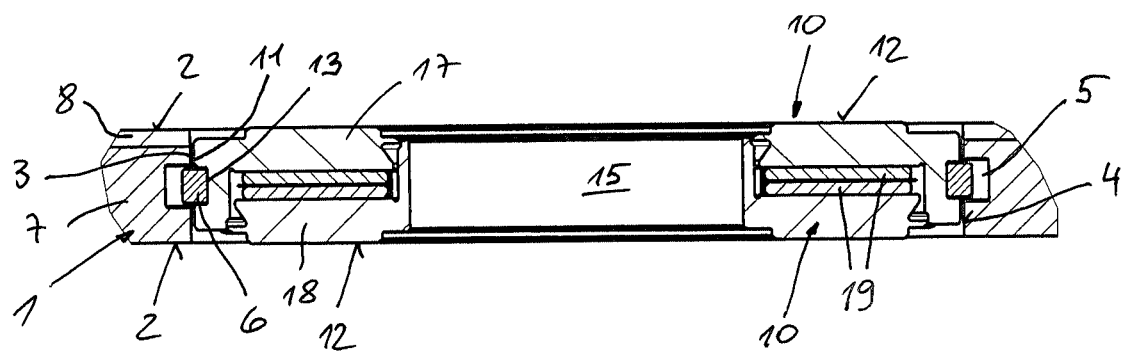
FIG. 3 shows a sectional view of a measurement element in mounting position according to line III-III in FIG. 1.

The first embodiment variant of the measurement system according to the invention shown in FIGS. 1 to 3 has a thin, flat measurement element receptacle 1 with plane-parallel cover surfaces 2, which is of annular design and can be installed between torque- and/or force-transmitting machine parts (not shown). In the example shown, six measurement elements 10 are positioned with equal spacing in the circumferential direction in corresponding through-openings 3 of the measurement element receptacle 1 at the desired measuring points, and are mounted in a floating manner in the measurement element receptacle 1, i.e. mechanically fixed with defined play.

For this purpose, each of the annular measurement elements 10 has structures on its outer circumferential surface 11 which engage with play in at least one spatial direction parallel and/or normal to the cover surfaces 2 of the measurement element receptacle 1 in corresponding structures on the circumferential wall 4 of the through-opening 3.

In the illustrated example according to FIG. 1 to FIG. 3, an annular groove 13 is formed on the circumferential surface 11 of each measurement element 10, which accommodates at least one spring element 6, wherein the spring element 6 engages in an annular groove 5 in the circumferential wall 4 of the through-opening 3.

When installing the measurement element 10 in the measurement element receptacle 1, the spring element 6, which is designed, for example, as an annular spring open on one side, is first inserted into the annular groove 5 of the measurement element receptacle 1 and widened with an auxiliary means (e.g. a mandrel) in such a way that the measurement element 10 can be snapped into the through-opening 3 and then the annular spring engages in the annular groove 13 of the measurement element 10 (see FIG. 3).

The depth of the annular groove 5 in the measurement element receptacle 1 is sufficient to accommodate the annular spring 6 in its entirety when the measurement element 10 is installed. Furthermore, the width of the annular groove 5 is slightly larger than the width of the annular spring 6, so that play in the range of 0.01 mm to 0.5 mm can be set in a direction normal to the cover surfaces 2 of the measurement element receptacle 1.

Furthermore, the outer diameter of the measurement element 10 is slightly smaller than the diameter of the through-hole 3, so that play in the range of 0.01 mm to 0.5 mm can be set in all directions parallel to the cover surfaces 2 of the measurement element receptacle 1.

The force-introducing boundary surfaces 12 of the measurement element 10 protrude slightly, for example >0.01 mm, beyond the plane-parallel cover surfaces 2 of the measurement element receptacle 1, which ensures measurement in direct frictional contact of the measurement elements 10, without disturbing force shunt by the measurement element receptacle 1.

The circular measurement elements 10 according to FIG. 1 to FIG. 3 have central through-openings 15 which can accommodate screws or fastening means with which adjacent machine parts, for example flanges of a shaft assembly, can be screwed (not shown).

In the sectional view according to FIG. 3, the measurement element 10 is shown as an asymmetrical circular ring sensor with a low overall height, for example in the range of 2 mm to 6 mm, whose two housing halves 17, 18 accommodate two measurement element disks 19. However, other circular ring sensors as well as circular measurement elements 20 without a through-hole can also be used (see FIG. 6).

Furthermore, the measurement element 10 can also have more than two measurement element disks 19 and several signal outputs, preferably combined into one connection cable, so that different measured values (for example a pressure or force measurement and a torque measurement) can be carried out simultaneously with one measurement element 10 at the same measuring location. To fulfill several measuring tasks at one measuring position, two measurement elements 10 can also be arranged one above the other in a through-opening 3.

The measurement element receptacle 1 comprises a base part 7 and a cover 8 that can be inserted into the base part 7, wherein recesses 9 are arranged in the base part 7, starting from the individual measurement elements 10, for the electrical contacting 16 of the measurement elements 10. The individual signal conductors of the measurement elements 10 are brought together to form a connector element 21 on the outer circumference of the circular measurement element receptacle 1.

Figure 4:
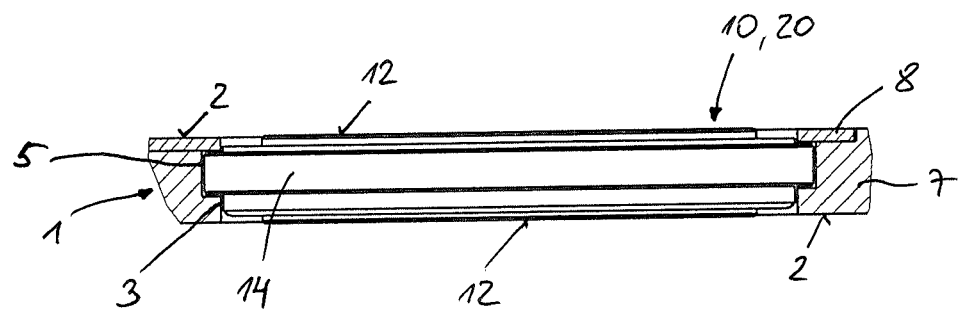
FIG. 4 shows an embodiment variant of the measurement element in a sectional view according to FIG. 3.

The embodiment variant according to FIG. 4 shows a measurement system in which a circumferential web 14 is formed on the measurement element 10, which engages in an annular groove 5 in the through-opening 3 of the measurement element receptacle 1, wherein the annular groove 5 is bounded on the one hand by a base part 7 and on the other hand by a cover 8 of the measurement element receptacle 1, which can be inserted into the base part 7. The force-introducing boundary surfaces 12 of the measurement element 10 also project slightly beyond the plane-parallel cover surfaces 2 of the measurement element receptacle 1 in this variant, so that measurements can be taken directly in the frictional connection of the measurement elements 10 without any disturbing force shunt through the measurement element receptacle 1.

The width of the annular groove 5 is slightly larger than the width of the circumferential web 14, so that play in the range of 0.01 mm to 0.5 mm can be set in a direction normal to the cover surfaces 2 of the measurement element receptacle 1.

Furthermore, also in this variant of the invention, the diameter of the measurement element 10 (with central through-opening 15) or 20 (without through-opening) is slightly smaller than the diameter of the through-opening 3. Furthermore, the circumferential web 14 maintains a distance from the groove base of the circumferential groove 5, so that play in the range of 0.01 mm to 0.5 mm can be set in all directions parallel to the cover surfaces 2 of the measurement element receptacle 1.

Figure 5:
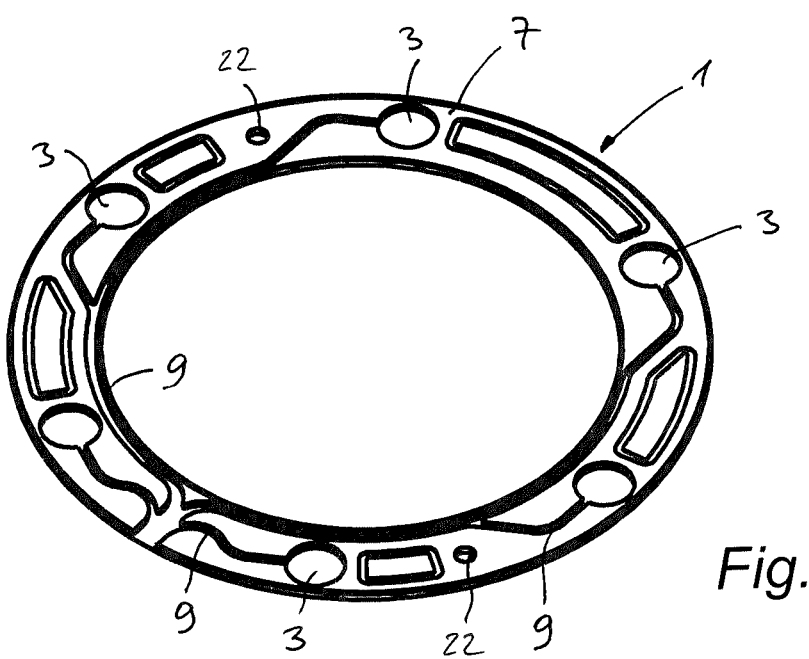
FIG. 5 shows the base part of the measurement element receptacle without cover in a three-dimensional representation.

In FIG. 5, a base part 7 of the two-part measurement element receptacle 1 is shown without cover 8 as well as without measurement elements 10, wherein, in addition to the through-openings 3 and recesses 9, openings 22 are also provided for locating pins for fixing the position of the measurement system.

The measurement elements 10 or 20 inserted with play into the measurement element receptacle 1 can—as viewed in a direction normal to the plane-parallel cover surfaces 2 of the measurement element receptacle 1—be circularly closed (see FIG. 6) or circularly annular with a through-opening 15 (see FIG. 2).

Figure 6:
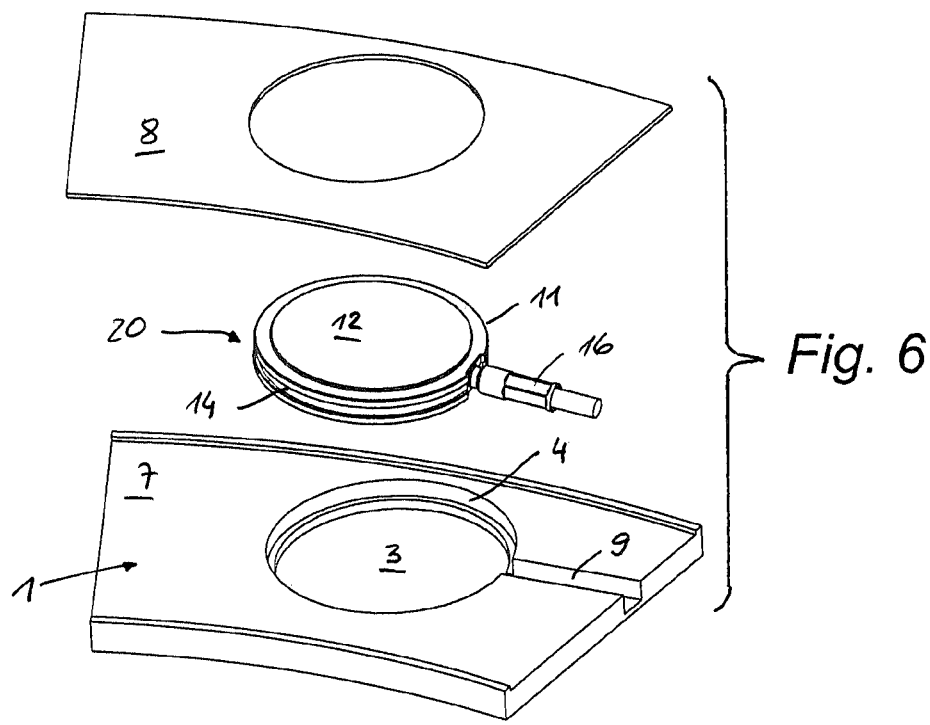
FIG. 6 shows a detail of an embodiment variant of the measurement system according to the invention in an exploded view.

FIG. 6 shows a variant of the invention with a measurement element 20 with closed, force-introducing interfaces 12, which is equipped with a collar or circumferential web 14 that holds the measurement element 20 in position with play after insertion of the cover 8. The installation situation is shown in the sectional view according to FIG. 4.

Figure 7:
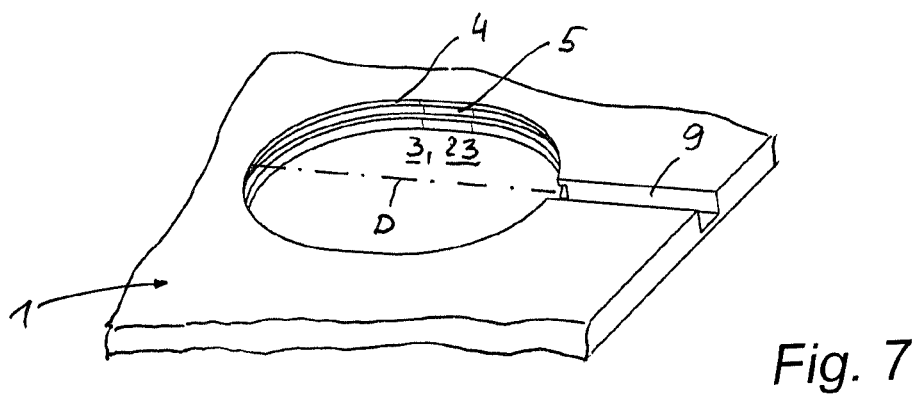
FIG. 7 shows a detail of a through-opening (elongated hole) in the measurement element receptacle.
Figure 8:
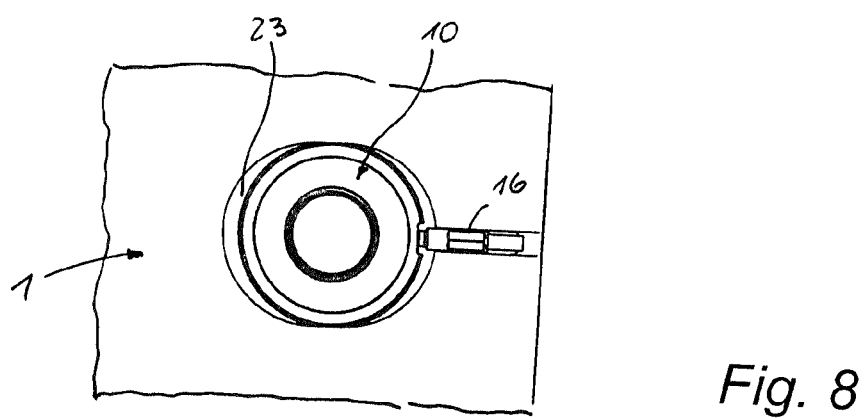
FIG. 8 shows the through-opening according to FIG. 7 with inserted measurement element.

In the embodiment variant of the invention outlined in FIG. 7 and FIG. 8, at least one through-opening 3 in the measurement element receptacle 1 is designed as an elongated hole 23. In the direction of the long diameter D of the elongated hole 23, increased play in the range of several mm is therefore available in this variant. For individual or all measurement elements 10 of a measurement element receptacle 1, an asymmetrical positional tolerance of individual or all measurement elements 10 defined by the length and alignment of the elongated hole 23 can thus be provided.

The invention claimed is:

1. A measurement system comprising:
   a flat measurement element receptacle having substantially parallel cover surfaces, configured and arranged for installation between torque- and/or force-transmitting machine parts; and
   at least one piezoelectric measurement element arranged in a through-opening of the flat measurement element receptacle and mechanically fixed with defined play in the through-opening.

2. The measurement system according to claim 1, wherein the at least one piezoelectric measurement element has a circumferential surface and the through-opening has a circumferential wall, wherein the circumferential surface includes structures configured and arranged to engage with play in at least one spatial direction parallel to the substantially parallel cover surfaces and/or normal to the substantially parallel cover surfaces in corresponding structures on the circumferential wall of the through-opening.

3. The measurement system according to claim 2, further including an annular groove formed on the circumferential surface of the at least one piezoelectric measurement element, the annular groove is configured and arranged to accommodate at least one at least one spring element, wherein the at least one spring element engages in an annular groove in the circumferential wall of the through-opening.

4. The measurement system according to claim 3, wherein the at least one spring element is an annular spring open on one side.

5. The measurement system according to claim 1, further including a circumferential web formed on the at least one piezoelectric measurement element and engages an annular groove in the through-opening, wherein the annular groove is delimited by a base part and a cover of the flat measurement element receptacle, and the cover is configured and arranged to be inserted into the base part.

6. The measurement system according to claim 1, wherein the at least one piezoelectric measurement element, viewed in a direction normal to the substantially parallel cover surfaces of the flat measurement element receptacle, is of circularly closed design.

7. The measurement system according to claim 1, further including at least one through-opening in the flat measurement element receptacle that is an elongated hole.

8. The measurement system according to claim 1, wherein the at least one piezoelectric measurement element includes a plurality of measurement elements arranged in a measurement element receptacle having an annular design.

9. The measurement system according to claim 1, wherein the at least one piezoelectric measurement element includes a plurality of measurement elements arranged in predetermined positions of a force measuring plate.

10. The measurement system according to claim 9, wherein the flat measurement element receptacle includes a base part and a cover which is configured and arranged to be inserted into the base part; and
   further including recesses formed in the base part and positioned within the base part starting from the positions of individual measurement elements of the plurality of measurement elements, and configured and arranged to electrically contact the individual measurement elements.

11. The measurement system according to claim 1, wherein the flat measurement element receptacle consists of one of the following materials: steel, aluminum, aluminum alloy, or plastic.

12. The measurement system of claim 1, wherein the at least one piezoelectric measurement element, as viewed in a direction normal to the substantially parallel cover surfaces of the flat measurement element receptacle, is of circularly annular design with a through-opening.

13. The measurement system according to claim 1, wherein the defined play is in a range of from 0.01 to 0.5 millimeters in a direction normal to the substantially parallel cover surfaces.

14. The measurement system according to claim 1, wherein the defined play is in a range of from 0.01 to 0.5 millimeters in a direction parallel to the substantially parallel cover surfaces.

15. A measurement element comprising
parallel, force-introducing boundary surfaces and a circumferential surface having piezoelectric measurement element disks arranged between the boundary surfaces, wherein the circumferential surface further includes structures configured and arranged to mechanically fix, with play, the piezoelectric measurement element with a measurement element receptacle.

16. A measurement system comprising:
a flat measurement element receptacle with substantially parallel cover surfaces and including a through-opening with a circumferential wall, and configured and arranged to be installed between torque- and/or force-transmitting machine parts; and at least one piezoelectric measurement element arranged in the through-opening of the flat measurement element receptacle, and mechanically fixed with defined play in the through-opening, the at least one piezoelectric measurement element including a circumferential surface with structures configured and arranged to engage with play in at least one spatial direction parallel to the substantially parallel cover surfaces and/or normal to the substantially parallel cover surfaces in corresponding structures on the circumferential wall of the through-opening.

* * * * *